(12) United States Patent
Kim (10) Patent No.: US 10,805,568 B2
(45) Date of Patent: Oct. 13, 2020

(54) RAMP SIGNAL GENERATION DEVICE AND CMOS IMAGE SENSOR USING THE SAME

(71) Applicant: SK hynix Inc., Icheon-si (KR)

(72) Inventor: Hyeon-June Kim, Yeosu-si (KR)

(73) Assignee: SK hynix Inc., Icheon-si (KR)

( * ) Notice: Subject to any disclaimer, the term of this patent is extended or adjusted under 35 U.S.C. 154(b) by 8 days.

(21) Appl. No.: 16/218,941

(22) Filed: Dec. 13, 2018

(65) Prior Publication Data

US 2020/0036924 A1    Jan. 30, 2020

(51) Int. Cl.
*H04N 5/378* (2011.01)
*H04N 5/376* (2011.01)

(52) U.S. Cl.
CPC ........... *H04N 5/378* (2013.01); *H04N 5/3765* (2013.01)

(58) Field of Classification Search
CPC ...... H04N 5/376; H04N 5/3765; H04N 5/378; H03M 1/34–468; H03M 1/66–88; H03K 4/08–90
See application file for complete search history.

(56) References Cited

U.S. PATENT DOCUMENTS

| | | | |
|---|---|---|---|
| 2009/0195431 A1* | 8/2009 | Snoeij | H03M 1/144 341/155 |
| 2012/0006974 A1* | 1/2012 | Egawa | H04N 5/3742 250/208.1 |
| 2015/0171841 A1* | 6/2015 | Lee | H03K 4/08 327/126 |
| 2016/0205333 A1* | 7/2016 | Shishido | H04N 5/378 348/308 |
| 2019/0394415 A1* | 12/2019 | Liu | H04N 5/3696 |

FOREIGN PATENT DOCUMENTS

| | | |
|---|---|---|
| KR | 10-20080101763 | 11/2008 |
| KR | 10-20150000759 | 1/2015 |

* cited by examiner

*Primary Examiner* — Paul M Berardesca
(74) *Attorney, Agent, or Firm* — Perkins Coie LLP (57) ABSTRACT

A ramp signal generation device may be provided to include a ramp signal generator including a plurality of local ramp signal generators, each local ramp signal generator structured to generate a local ramp signals having a local ramp range based on a control of an external control unit, an AC coupler coupled to the ramp signal generator to receive local ramp signals from the ramp signal generator, the AC couple structured to perform AC coupling on the received local ramp signals and generate AC-coupled ramp signals, and an integrator coupled to the AC coupler to receive the AC-coupled ramp signals and structured to integrate the AC-coupled ramp signals into a ramp signal having a full ramp range.

14 Claims, 9 Drawing Sheets

RAMP SIGNAL GENERATION DEVICE AND CMOS IMAGE SENSOR USING THE SAME

CROSS-REFERENCE TO RELATED APPLICATION

This patent document claims priority to Korean Patent Application No. 10-2018-0088754 filed on Jul. 30, 2018, which is incorporated herein by reference in its entirety.

TECHNICAL FIELD

The technology and implementations disclosed in this patent document relate to a complementary metal oxide semiconductor (CMOS) image sensor (CIS) including a ramp signal generation device.

BACKGROUND

With the recent development of the information communication industry and the digitalization of electronic devices, image sensors with improved performance have been used in various fields such as digital camera, a camcorder, a mobile phone, a PCS (personal communication system), a game machine, security camera and a medical micro camera. In addition, with the increase in the demand for a CIS for mobile products, the need for a technique for implementing the CIS with low power has increased.

SUMMARY

Various embodiments are directed to a ramp signal generation device and an image censor including the ramp signal generation device. According to various implementations, the ramp signal generation device can include a plurality of local ramp signal generator, thereby securing an operation margin of a ramp signal generator with low power.

In an embodiment, a ramp signal generation device can include a ramp signal generator including a plurality of local ramp signal generators. Each local ramp signal generator can be structured to generate a local ramp signal having a local ramp range based on a control of an external control unit. The ramp signal generation device can include an AC coupler coupled to the ramp signal generator to receive local ramp signals from the ramp signal generator. The AC coupler can be structured to perform AC coupling on the received local ramp signals and generate AC-coupled ramp signals. The ramp signal generation device can include an integrator coupled to the AC coupler to receive the AC-coupled ramp signals and structured to integrate the AC-coupled ramp signals into a ramp signal having a full ramp range. Here, the local ramp range may be determined by dividing the full ramp range by the number of the local ramp signal generators.

The ramp signal generation device can include a buffer coupled to the integrator to buffer the ramp signal.

In the ramp signal generation device, a power having a voltage level is supplied to the ramp signal generator, the integrator, and the buffer, and the voltage level is lower than 2.8V. By the way example but not limitation, a power having a first voltage level being lower than 2.8V is supplied to the integrator and the buffer. Another power having a second voltage level lower than the first voltage level is supplied to the ramp signal generator.

The local ramp signal generators can be sequentially operated to generate the local ramp signals based on the control of the control unit.

The AC coupler can include coupling capacitors, each coupling capacitor coupled to each local ramp signal.

By the way example but not limitation, the ramp signal is designed for a pixel resolution of at least 10 bits, and a power supplied to the plurality of local ramp signal generators have a voltage level lower than 2.0 V.

In an embodiment, each of the local ramp signal generators can include a plurality of unit current cells. The number of the unit current cells may decrease compared to a case when the ramp signal generator directly generates the ramp signal without including the local ramp signal generators.

In an embodiment, the number of unit current cells included in the plurality of local ramp signal generators does not change compared to a case when the ramp signal generator directly generates the ramp signal without including the local ramp signal generators.

In an embodiment, a complementary metal oxide semiconductor (CMOS) image sensor (CIS) can include a pixel array including pixels arranged in rows and columns, the pixels structured to output pixel signals corresponding to incident light; a row decoder coupled to the pixel array and structured to select a row within the pixel array; a ramp signal generation device coupled to the pixel array and including a ramp signal generator including a plurality of local ramp signal generators, each local ramp signal generator generating a local ramp signal and the ramp signal generator structured to provide a ramp signal by combining local ramp signals generated by the plurality of local ramp signal generators; a comparison unit coupled to the ramp signal generation device and the pixel array and structured to compare the ramp signal with the pixel signals and generate comparison results; a counting unit coupled to the comparison unit and structured to count a clock according to each of the comparison results; a memory unit coupled to the counting unit and structured to store counting information from the counting unit; a control unit coupled to the row decoder, the ramp signal generation device, the comparison unit, the counting unit, and the memory unit and structured to control the row decoder, the ramp signal generation device, the comparison unit, the counting unit and the memory unit; and a column readout circuit coupled to the control unit and the memory unit and structured to output data of the memory unit according to the control of the control unit.

The ramp signal generation device can further include an AC coupler coupled to the ramp signal generator to receive the local ramp signals from the ramp signal generator, the AC coupler structured to perform AC coupling on the received local ramp signals and generate AC-coupled ramp signals; and an integrator coupled to the AC coupler to receive the AC-coupled ramp signals and structured to integrate the AC-coupled ramp signals to generate the ramp signal. The ramp signal has a full ramp range and each local ramp signal has a local ramp range determined by dividing the full ramp range by the number of the plurality of local ramp signal generators.

In an embodiment, a ramp signal generation device may include: a ramp signal generator, including a plurality of local ramp signal generators, suitable for generating a plurality of local ramp signals under control of an external control unit; an AC coupler suitable for AC coupling the plurality of local ramp signals generated by the ramp signal generator; and an integrator suitable for generating one ramp signal by integrating the plurality of AC-coupled ramp signals received from the AC coupler.

In an embodiment, a CIS may include: a pixel array suitable for outputting pixel signals corresponding to incident light; a row decoder suitable for selecting and controlling a pixel within the pixel array for each row line; a ramp signal generation device suitable for generating a ramp signal using a plurality of local ramp signals generated by a plurality of local ramp signal generators; a comparison unit suitable for comparing the ramp signal applied from the ramp signal generation device to the pixel signals from the pixel array; a counting unit suitable for counting a clock according to each of output signals from the comparison unit; a memory unit suitable for storing counting information from the counting unit; a control unit suitable for controlling the operations of the row decoder, the ramp signal generation device, the comparison unit, the counting unit and the memory unit; and a column readout circuit suitable for outputting the data of the memory unit according to control of the control unit.

DETAILED DESCRIPTION

The disclosed technology can be implemented to provide a ramp generation device and a CMOS image sensor (CIS) including the ramp generation device, wherein the ramp generation device is structured to secure its performance even when a lower supply voltage is provided to the ramp generation device.

As discussed above, the need for a CIS which is operated with low power has increased. To implement such CIS operated with low power, a technique to secure a dynamic performance of the CIS at a same level as one with regular power is needed. However, as the supply voltage to the ramp generation device decreases, there are many limitations or difficulties for an analog circuit such as a ramp signal generator to secure its operation margin.

For example, in a ramp signal generator implemented with a unit current cell array, when the supply voltage is lowered, it becomes difficult to secure its operation margin. Thus, in the case of an open-loop circuit, various non-linearity issues occur, which causes a comparator at a late stage to use a non-linearity ramp signal when converting an analog pixel signal into a digital signal. Thus, the non-linearity issues cause a noisy digital code value and degrade the performance of a signal-to-noise ratio (SNR) or a dynamic range (DR).

In recognition of the above, some implementations of the disclosed technology suggest techniques and circuits to secure an operation margin of a ramp generation device. Hereafter, exemplary embodiments will be described with reference to the accompanying drawings.

Throughout the specification, when one element is referred to as being "connected to" or "coupled to" another element, it may indicate that the former element is "directly connected or coupled to" the latter element or the former element is "electrically connected or coupled to" the latter element with another element interposed therebetween. Furthermore, when an element "includes" or "has" a component, it may indicate that the element does not exclude another component but can further include another component, unless referred to the contrary.

Figure 1:
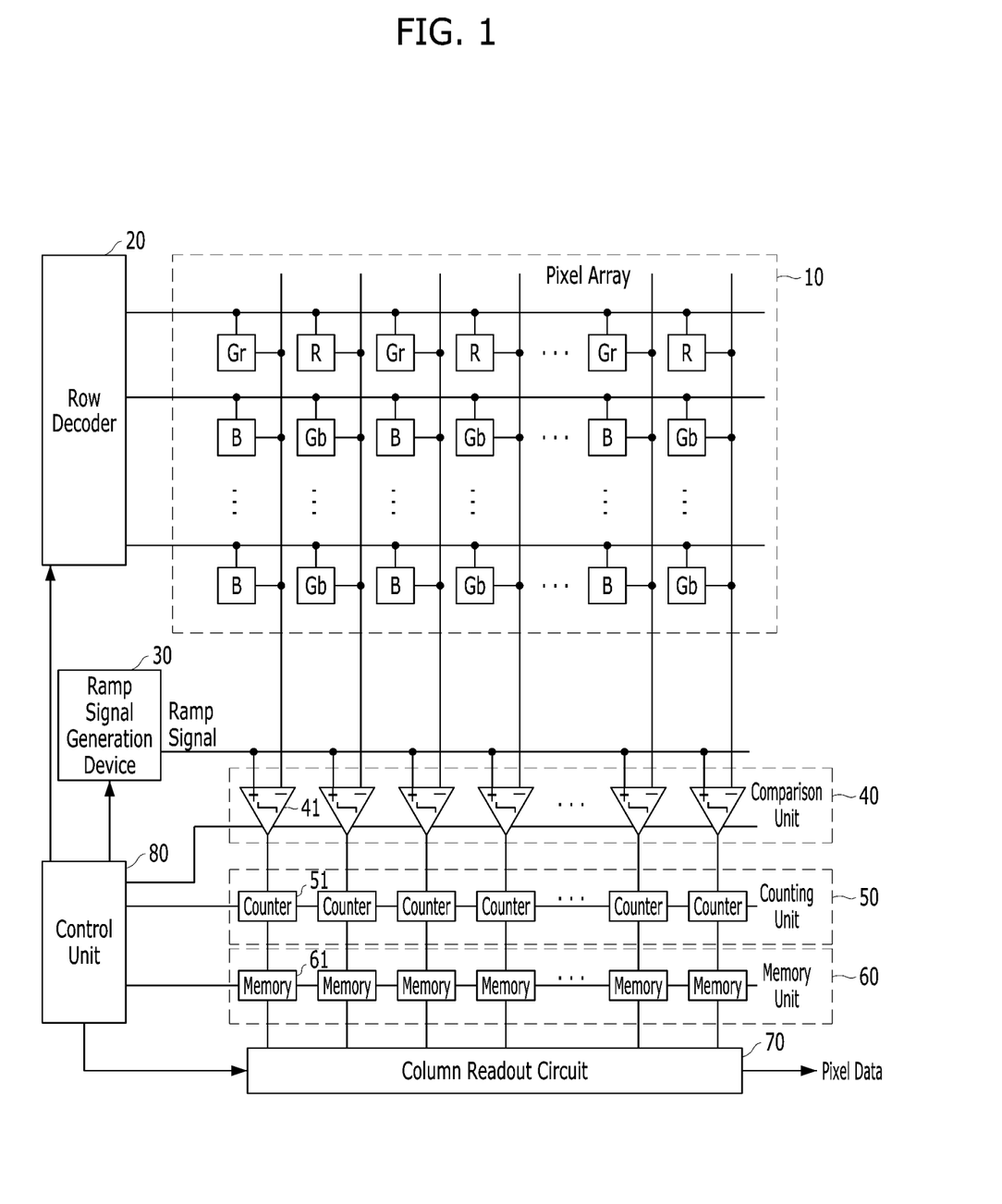
FIG. 1 illustrates an overall structure of CIS for promoting understandings of embodiments.

FIG. 1 illustrates an example of a complementary metal oxide semiconductor (CMOS) image sensor (CIS) showing a CIS with a column parallel structure, which is implemented with a general single-slope analog-to-digital converter.

As illustrated in FIG. 1, the CIS for promoting understandings of the embodiments may include a pixel array 10, a row decoder 20, a ramp signal generation device 30, a comparison unit 40, a counting unit 50, a memory unit 60, a control unit 80 and a column readout circuit 70. The pixel array 10 may output pixel signals corresponding to incident light. The row decoder 20 may select a pixel in the pixel array 10 at a corresponding row line and control an operation of the selected pixel, under control of the control unit 80. The ramp signal generation device 30 may generate a ramp signal, under control of the control unit 80. The comparison unit 40 may compare the value of the ramp signal applied from the ramp signal generation device 30 with the values of the pixel signals outputted from the pixel array 10, under control of the control unit 80. The counting unit 50 may count a clock applied from the control unit 80 according to each of output signals of the comparison unit 40. The memory unit 60 may store the counting information from the counting unit 50, under control of the control unit 80. The control unit 80 may control the operations of the row decoder 20, the ramp signal generation device 30, the comparison unit 40, the counting unit 50, the memory unit 60 and the column readout circuit 70. The column readout circuit 70 may sequentially output the data of the memory unit 60 as pixel data PXDATA, under control of the control unit 80.

In some implementations, the CIS may compare pixel signals (pixel output voltages) obtained from different pixels (e.g., a dark or reference cell and an actual light-inputted cell) of the pixel array 10 with each other to remove an offset value of a pixel that is not caused by the incident light and measure only a pixel signal generated in response to incident light. Such a technique may be referred to as correlated double sampling (CDS). The CDS may be performed by the comparison unit 40.

The comparison unit 40 may include a plurality of comparators, the counting unit 50 may include a plurality of counters, and the memory unit 60 may include a plurality of memories. Thus, the comparators, the counters and the memories may be provided at the respective columns.

Referring to FIG. 1, operations of one comparator, one counter and one memory will be described as follows.

First, a first comparator 41 may have a terminal to receive a pixel signal outputted from a first column of the pixel array 10 and another terminal to receive a ramp signal applied from the ramp signal generation device 30t. The first comparator 41 may compare the received pixel signal with the received ramp signal according to a control signal from the control unit 80, and output a comparison signal.

Since the ramp signal $V_{RAMP}$ has a voltage level that increases or decreases to a predetermined magnitude with time elapsed after initialization is started, the values of the two signals inputted to the respective terminals of the comparator may coincide with each other at a certain point of time. After the point of time that the values of the two signals coincide with each other, the value of the comparison signal outputted from each of the comparators may be inverted.

A first counter 51 may count the clock applied from the control unit 80 for a time period from when the ramp signal decreases to when the comparison signal outputted from the comparator 41 is inverted, and output the counting information. Each of the counters may be reset according to a reset control signal from the control unit 80.

The first memory 61 may store the counting information from the counter 51 and output the counting information to the column readout circuit 70, according to a load control signal from the control unit 80.

At this time, the CIS may count a reset signal (reset voltage), and then count an image signal (signal voltage).

Figure 2A:
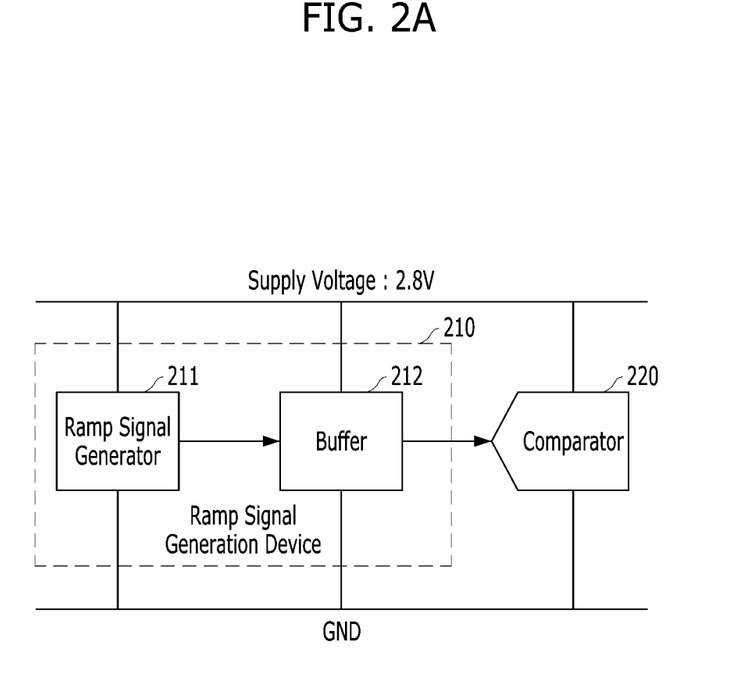
FIG. 2A is a block diagram illustrating a ramp signal generation device for promoting understandings of the embodiments.
Figure 2B:
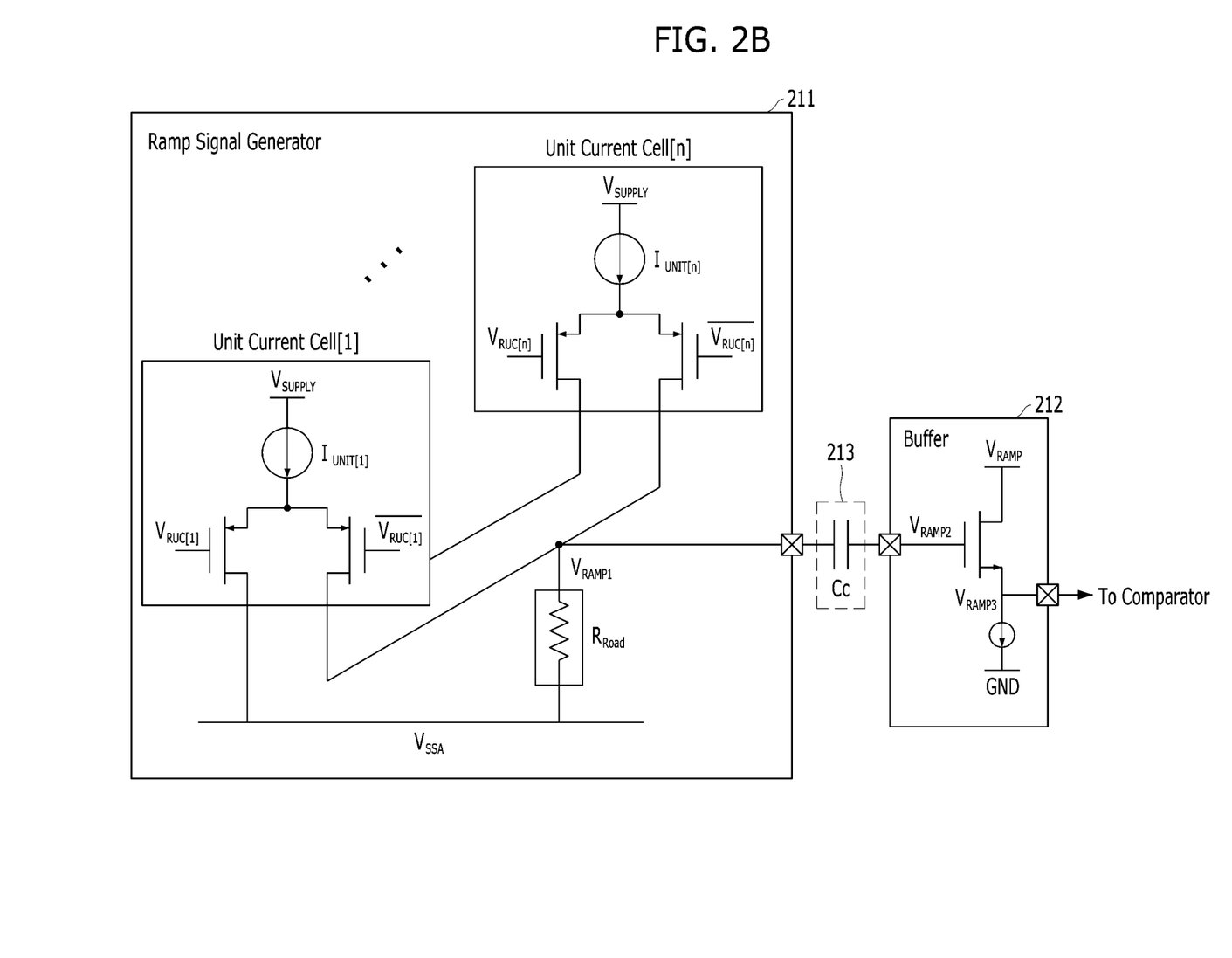
FIG. 2B is a circuit diagram illustrating a ramp signal generation device for promoting understanding of the embodiment.

FIG. 2A is a block diagram illustrating a ramp signal generation device for promoting understandings of embodiments, and FIG. 2B is a circuit diagram illustrating a ramp signal generation device for promoting understandings of embodiments.

As illustrated in FIG. 2A, the ramp signal generation device 210 may include a ramp signal generator 211 for generating a ramp signal (ramp voltage) under control of a control unit (for example, the control unit 80 of FIG. 1) and a buffer 212 for buffering the ramp signal generated by the ramp signal generator 211 and applying the buffered ramp signal to a comparator 220 (for example, the comparison unit of FIG. 1).

In some cases, the ramp signal generation device 210 may receive a supply voltage of 2.8V in order to secure an operation margin.

As illustrated in FIG. 2B, the ramp signal generator 211 may be configured as a unit current cell array including multiple unit current cells, and a ramp resistor $R_{Road}$ may be coupled to a common node of the unit current cell array. At this time, the ramp signal generator 211 may generate a ramp signal $V_{RAMP1}$ through an operation of sequentially turning on/off unit current cells based on timings of $V_{RUC}[n]$ and $V_{RUCB}[n]$. $V_{RUC}[n]$ is a switching signal to operate the unit current cell and $V_{RUCB}[n]$ is the inverted switching signal. In this case, the ramp supply voltage $V_{SUPPLY}$ of 2.8V may be applied. Furthermore, 'n' represents the total number of unit current cells, indicating the step number of the ramp signal generation device. In the case of a ramp signal having a resolution of 10 bit, 'n' may become 1,024.

Between the ramp signal generator 211 and the buffer 212, a coupling capacitor Cc 213 may be provided. The coupling capacitor 213 may AC-couple the ramp signal $V_{RAMP1}$ generated by the ramp signal generator 211, and apply the AC-coupled signal to the buffer 212. At this time, the coupling capacitor 213 may easily adjust a common signal (for example, DC level) between the ramp signal generator 211 and the buffer 212.

The buffer 212 may include an NMOS transistor and a current source, and receive and buffer the ramp signal $V_{RAMP2}$ AC-coupled by the coupling capacitor 213. Then, the buffer 212 may apply the buffered ramp signal $V_{RAMP3}$ to the comparator 220 (for example, the comparison unit of FIG. 1).

However, the ramp signal generator configured as the unit current cell array illustrated in FIG. 2B may have limitations and/or difficulties in securing an operation margin, due to a 'reference operation setting voltage' which is changed in the operation period of the ramp signal generator when the supply voltage is lowered from 2.8V to 1.8V, for example.

Therefore, some implementations of a ramp signal generation device are provided to secure an operation margin of a ramp signal generator even with a low supply voltage of 1.8V, for example, by using a plurality of local ramp signal generators. This configuration will be described in detail with reference to FIGS. 3A to 7.

Figure 3A:
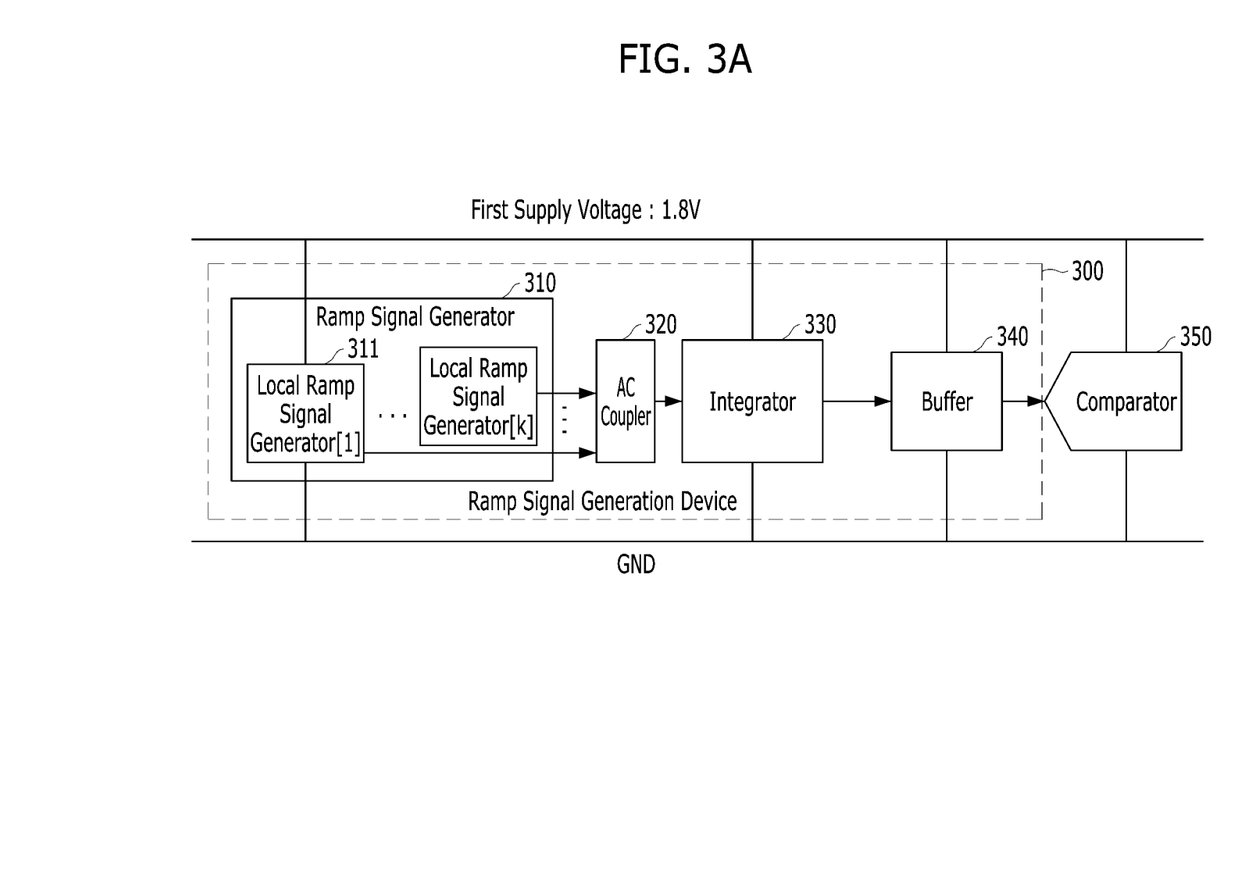
FIGS. 3A and 3B are examples of configuration diagrams illustrating a ramp signal generation device in accordance with an embodiment of the disclosed technology.
Figure 3B:
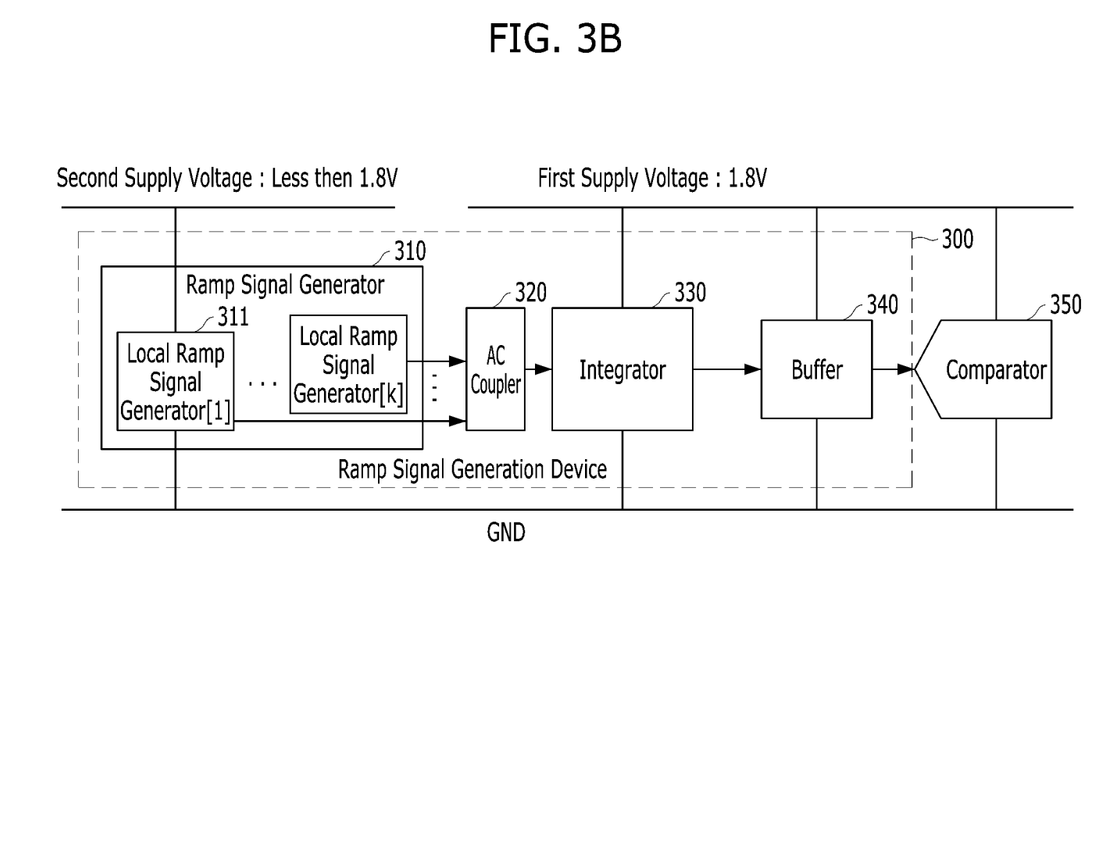

FIGS. 3A and 3B are configuration diagrams illustrating an example of a ramp signal generation device in accordance with an embodiment.

As illustrated in FIGS. 3A and 3B, the ramp signal generation device 300 in accordance with the embodiment may include a ramp signal generator 310, an AC coupler 320, an integrator 330 and a buffer 340. The ramp signal generator 310 may include a plurality of local ramp signal generators 311 to generate a plurality of local ramp signals under control of a control unit (for example, the control unit 80 of FIG. 1). The AC coupler 320 may AC-couple the plurality of local ramp signals generated through the ramp signal generator 310. The integrator 330 may integrate the ramp signals AC-coupled through the AC coupler 320. The buffer 340 may buffer the ramp signal integrated through the integrator 330, and apply the buffered signal to a comparator 350 (for example, the comparison unit of FIG. 1). In some implementations, the buffer 340 may be omitted.

The ramp signal generator 310 may be configured as a local ramp signal generator array including local ramp signal generators 311, and the local ramp signal generators 311 may be sequentially operated to generate local ramp signals with local ramp ranges, under control of the control unit (for example, the control unit 80 of FIG. 1). The local ramp ranges may be obtained by dividing a full ramp range into a plurality of ranges (for example, 'k' ranges when 'k' is an integer).

The AC coupler 320 may be configured as a coupling capacitor array which includes a plurality of coupling capacitors, each having a capacity corresponding to a value obtained by dividing the capacity of the coupling capacitor 213 of FIG. 2B by the number of the local ramp signal generators 311. For example, the number of the local ramp signal generators 311 within the ramp signal generator 310 may be equal to the number of the coupling capacitors 213 within the AC coupler 320.

In an embodiment, the AC coupler 320 may be coupled to the ramp signal generator 310 and receive the local ramp signals from the ramp signal generator 310. The AC coupler 320 may pass only AC components of the local ramp signals with the local ramp ranges and remove DC components from the local ramp signals. Each of the ramp signals of the local ramp signal generators 311 within the ramp signal generator 310 has a small range, i.e., a smaller range than a full ramp range, since each ramp signal is determined by dividing the full ramp range into the plurality of ranges. Thus, the ramp signal may contain little noise as compared when the ramp signal has the full ramp range, and the noise can be further reduced while the DC component of the ramp signal is removed through the AC coupler 320. As noise is reduced from the ramp signal, the operation of the image sensor may be further improved.

The integrator 330 may be implemented by various manners, for example, with a resistor, amplifier, capacitor and the like. Since implementing of the integrator 330 is publicly known, the descriptions thereof will be omitted herein. The integrator 330 may be coupled to the AC coupler 320 and generate a ramp signal with a wide range greater than that of each local ramp signal. For example, when a ramp signal with a wide range is generated through the integrator 330 by coupling the plurality of local ramp signals outputted from the coupling capacitor array within the AC coupler 320, a plurality of comparators corresponding to the respective local ranges do not need to be provided. If a plurality of comparators corresponding to the number of the local ramp signal generators 311 are required for the respective columns of an image sensor, the circuit complexity of the image sensor may be increased to degrade the integration density of the image sensor.

The buffer 340 may include an NMOS transistor and a current source as described above with reference to FIG. 2B.

In the ramp signal generation device 300 in accordance with the embodiment, the local ramp signal outputted by each of the local ramp signal generators 311 may have a small local ramp range. Therefore, although the supply voltage supplied to the ramp signal generator 300 including multiple local ramp signal generators 311 is lower than the conventional supply voltage (for example, 2.8V) of the existing ramp signal generation device implemented with one ramp signal generator, and the local ramp signal generator 311 in the ramp signal generator 300 receives the supply voltage from 0V to 2.8V, each of the local ramp signal generators 311 may secure the maximum power swing with the operation margin.

Therefore, as illustrated in FIG. 3A, the ramp signal generator 310, the integrator 330 and the buffer 340 of the ramp signal generation device 300 in accordance with the embodiment may be structured to receive a supply voltage (for example, 1.8V) which is less than the conventional supply voltage (for example, 2.8V) of the existing ramp signal generation device. In some implementations, the ramp signal generation device 300 can be implemented to use two different supply voltages. As illustrated in FIG. 3B, the integrator 330 and the buffer 340 of the ramp signal generation device 300 in accordance with the embodiment may be structured to receive a first supply voltage (for example, 1.8V) which is less than the conventional supply voltage (for example, 2.8V) of the existing ramp signal generation device, and the ramp signal generator 310 of the ramp signal generation device 300 may be structured to receive a second supply voltage less than the first supply voltage (for example, less than 1.8V). In this case, the second supply voltage of the ramp signal generation device 300 can be minimized, which allows to further save power for operating the image sensor.

Figure 4:
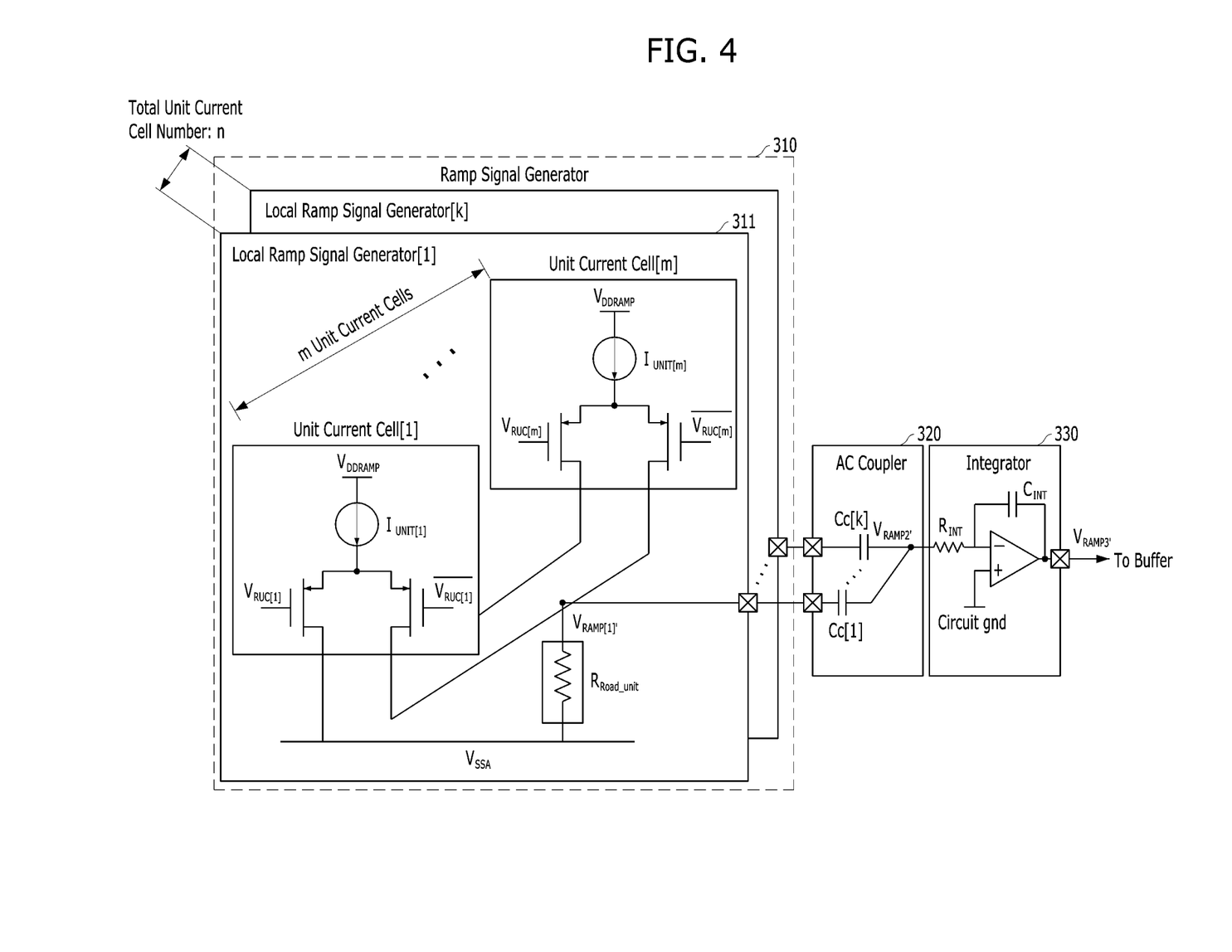
FIG. 4 is a circuit diagram illustrating an example of a ramp signal generation device in accordance with an embodiment of the disclosed technology.

FIG. 4 is a circuit diagram illustrating an example of a ramp signal generation device in accordance with an embodiment of the disclosed technology. FIG. 4 shows examples of circuit configurations of the ramp signal generator 310, the AC coupler 320 and the integrator 330.

As illustrated in FIG. 4, the ramp signal generation device in accordance with the embodiment may be configured as a local ramp signal generator array including multiple local ramp signal generators 311, unlike the existing ramp signal generator 211 of FIG. 2B. At this time, the local ramp signal generator array may include 'k' local ramp signal generators 311, i.e., a local ramp signal generator [1] to a local ramp signal generator [k], and 'k' may be decided as "(full ramp range/number of ranges of local ramp generators (local ramp ranges))". Each of the local ramp signal generators 311 may adjust the gain of a local ramp signal with the size of a ramp resistor $R_{Road\_unit}$, and operate as explained in FIG. 2B. Each of the local ramp signal generators 311 may include unit current cells and the number of the unit current cells ('m') included in each local ramp signal generator 311 is smaller than the number ('n') of unit current cells included in the existing ramp signal generator of FIG. 2B. However, the total number of unit current cells included in the k local ramp signal generators 311, i.e., 'm×K' may be equal to the number ('n') of unit current cells included in the existing ramp signal generator of FIG. 2B.

The ramp signal generation device in accordance with the embodiment may sequentially drive all of the unit current cells of each of the local ramp signal generators [1] to [k]. For example, each of the local ramp signal generators [1] to [k] may operate based on the control signal used in the existing ramp signal generator of FIG. 2B. In some implementations, the unit current cells of the local ramp signal generator [1] are driven sequentially, then the unit current cells of the local ramp signal generator [2] are driven sequentially, and so on. Thus, the driving of the unit current cells of each local ramp signal generator is repeated such that the unit current cells of the local ramp signal generators [1] to [k] are driven.

The AC coupler 320 may be configured as a coupling capacitor array including a plurality of coupling capacitors Cc[1] to Cc[k]. The integrator 330 may include a resistor $R_{INT}$ coupled to the AC coupler 320, an amplifier having one input terminal coupled to the resistor $R_{INT}$ and the other input terminal coupled to a ground voltage, and a capacitor $C_{INT}$ provided between the one input terminal and an output terminal of the amplifier.

The local ramp signals from the local ramp signal $V_{RAMP[1]}$, generated through the local ramp signal generator [1] to the local ramp signal $V_{RAMP[k]}$, generated through the local ramp signal generator [k] may be AC-coupled through the corresponding coupling capacitors Cc[1] to Cc[k] and then combined as a ramp signal $V_{RAMP2}$. The combined ramp signal $V_{RAMP2}$, may be integrated in the capacitor $C_{INT}$ through the resistor $R_{INT}$ and the amplifier. Then, a linear ramp signal $V_{RAMP3}$, may be outputted to the output terminal of the amplifier through a feedback network structure of the amplifier. The ramp signal $V_{RAMP3}$, may be applied to the comparator 350 through the buffer 340.

In the above-described ramp signal generation device in accordance with the embodiment, the local ramp signal outputted by each of the local ramp signal generators 311 can have a small range as compared to the existing ramp signal generation device of FIG. 2B. Thus, the supply voltage $V_{DDRRAMP}$ can be lowered as compared to the supply voltage $V_{SUPPLY}$ in FIG. 2B. Furthermore, the ramp signal generation device in accordance with the embodiment can secure a larger margin for a supply voltage variation in process than the existing ramp signal generation device, thereby securing a relatively high linearity.

Figure 5:
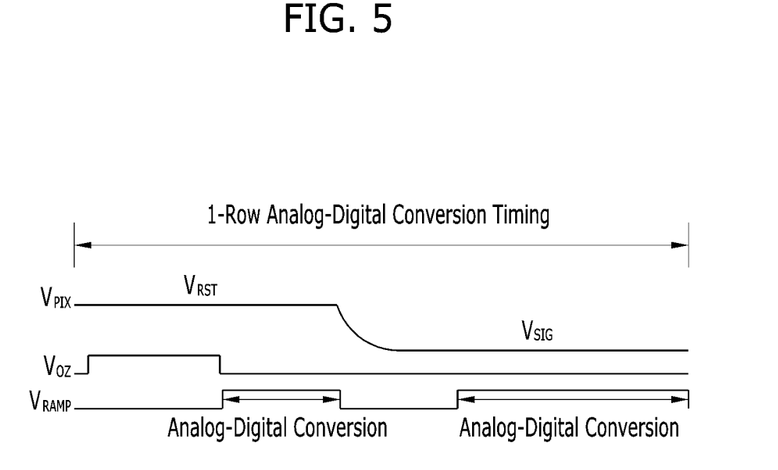
FIG. 5 is an example of a timing diagram illustrating an operation of a ramp signal generation device in accordance with an embodiment of the disclosed technology.

FIG. 5 is a timing diagram illustrating an example of an operation of the ramp signal generation device in accordance with an embodiment.

A pixel signal $V_{PIX}$ may indicate a signal which is outputted from a pixel and inputted to the comparator 350, and include a reset voltage $V_{RST}$ and a signal voltage $V_{SIG}$.

An auto-zeroing signal $V_{oz}$ may indicate an auto-zeroing operation period of the comparator 350. The auto-zeroing signal $V_{oz}$ may be supplied from the control unit as known in the art.

A ramp signal $V_{RAMP}$ may indicate a signal generated by the ramp signal generation device 300 in accordance with the embodiment and include a section for analog-digital converting the reset voltage $V_{RST}$ and a section for analog-digital converting the signal voltage $V_{SIG}$. In some implementations, the ramp signal $V_{RAMP}$ have the same operation timing as the existing ramp signal generation device. Thus, the ramp signal generation device 300 in accordance with the embodiment can maintain the operation of the existing ramp signal generation device. Thus, the ramp signal generation device 300 can be used instead of the existing ramp signal generation device without changing current control schemes in the image sensor.

Figure 6:
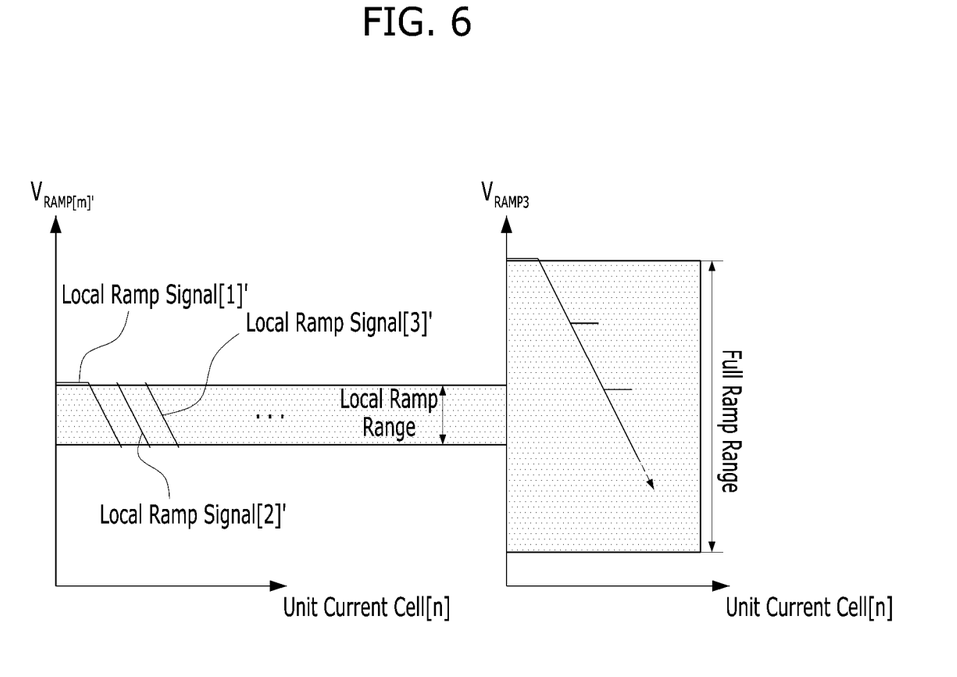
FIG. 6 illustrates an example of a ramp voltage outputted from a ramp signal generation device in accordance with an embodiment of the disclosed technology.

FIG. 6 illustrates the ramp voltage outputted from the ramp signal generation device in accordance with the embodiment.

As illustrated in FIG. 6, the local ramp signal outputted from the local ramp signal generator 311 may have a small range compared to the full range of the existing ramp signal generation device. When the local ramp signals are passed through the AC coupler 320 and the integrator 330, the local ramp signals may be outputted as the ramp signal $V_{RAMP3'}$ with a greater range than the small range of each local ramp signal. The range of the ramp signal $V_{RAMP3'}$ is same as the full range of the existing ramp signal generation device.

Figure 7:
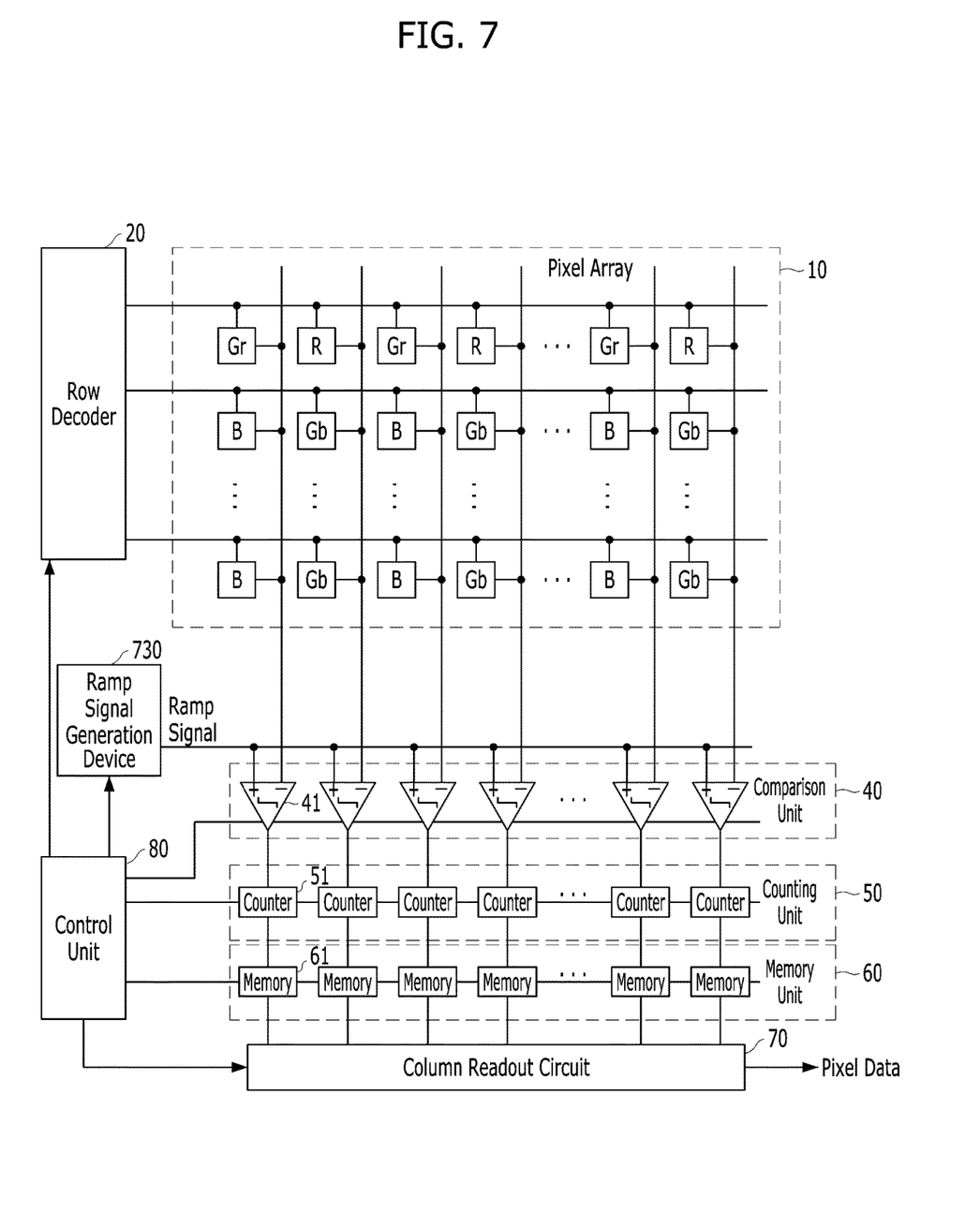
FIG. 7 is an example of a configuration diagram illustrating a CIS in accordance with an embodiment of the disclosed technology.

FIG. 7 is a configuration diagram illustrating a CIS in accordance with an embodiment.

As illustrated in FIG. 7, the CIS in accordance with the embodiment may include a pixel array 10, a row decoder 20, a ramp signal generation device 730 in accordance with an embodiment, a comparison unit 40, a counting unit 50, a memory unit 60, a control unit 80 and a column readout circuit 70. The pixel array 10 may output pixel signals corresponding to incident light. The row decoder 20 may select a pixel in the pixel array 10 at each row line and control an operation of the selected pixel, under control of the control unit 80. The ramp signal generation device 730 may generate a ramp signal under control of the control unit 80. The comparison unit 40 may compare the value of the ramp signal applied from the ramp signal generation device 730 to the values of the pixel signals outputted from the pixel array 10, under control of the control unit 80. The counting unit 50 may count a clock applied from the control unit 80 according to each of output signals from the comparison unit 40. The memory unit 60 may store the counting information from the counting unit 50 under control of the control unit 80. The control unit 80 may control the operations of the row decoder 20, the ramp signal generation device 730, the comparison unit 40, the counting unit 50, the memory unit 60 and the column readout circuit 70. The column readout circuit 70 may sequentially output the data of the memory unit 60 as pixel data PXDATA under control of the control unit 80. The ramp signal generation device 730 in accordance with the embodiment may be configured in the same manner as the ramp signal generation device described above with reference to FIGS. 3 to 6.

In accordance with the embodiment, the ramp signal generation device can secure an operation margin of the ramp signal generator with low power, by using the plurality of local ramp signal generators.

Although various embodiments have been described for illustrative purposes, it will be apparent to those skilled in the art that various changes and modifications can be made based on the disclosed technology.

What is claimed is:

1. A ramp signal generation device, comprising:
    a ramp signal generator including a plurality of local ramp signal generators, each local ramp signal generator structured to generate a local ramp signal having a local ramp range based on a control of an external control unit;
    an AC coupler coupled to the ramp signal generator to receive local ramp signals from the ramp signal generator, the AC coupler structured to perform AC coupling on the received local ramp signals and generate AC-coupled ramp signals; and
    an integrator coupled to the AC coupler to receive the AC-coupled ramp signals and structured to integrate the AC-coupled ramp signals into a ramp signal having a full ramp range,
    wherein the local ramp range is determined by dividing the full ramp range by the number of the local ramp signal generators.

2. The ramp signal generation device according to claim 1, further comprising a buffer coupled to the integrator to buffer the ramp signal.

3. The ramp signal generation device according to claim 2, wherein power having a voltage level is supplied to the ramp signal generator, the integrator, and the buffer, and the voltage level is lower than 2.8V.

4. The ramp signal generation device according to claim 2, wherein power having a first voltage level is supplied to the integrator and the buffer, the first voltage level being lower than 2.8V, and power having a second voltage level is supplied to the ramp signal generator, the second voltage level lower than the first voltage level.

5. The ramp signal generation device according to claim 1, wherein the local ramp signal generators are sequentially operated to generate the local ramp signals based on the control of the control unit.

6. The ramp signal generation device according to claim 1, wherein the AC coupler includes coupling capacitors, each coupling capacitor coupled to each local ramp signal.

7. The ramp signal generation device according to claim 1, wherein the ramp signal is designed for a pixel resolution of at least 10 bits, and
    power supplied to the plurality of local ramp signal generators have a voltage level lower than 2.0 V.

8. A complementary metal oxide semiconductor (CMOS) image sensor (CIS), comprising:
    a pixel array including pixels arranged in rows and columns, the pixels structured to output pixel signals corresponding to incident light;
    a row decoder coupled to the pixel array and structured to select a row within the pixel array;
    a ramp signal generation device coupled to the pixel array and including a ramp signal generator including a plurality of local ramp signal generators, each local ramp signal generator generating a local ramp signal and the ramp signal generator structured to provide a ramp signal by combining local ramp signals generated by the plurality of local ramp signal generators;
    a comparison unit coupled to the ramp signal generation device and the pixel array and structured to compare the ramp signal with the pixel signals and generate comparison results;
    a counting unit coupled to the comparison unit and structured to count a clock according to each of the comparison results;
    a memory unit coupled to the counting unit and structured to store counting information from the counting unit;

a control unit coupled to the row decoder, the ramp signal generation device, the comparison unit, the counting unit, and the memory unit and structured to control the row decoder, the ramp signal generation device, the comparison unit, the counting unit and the memory unit; and a column readout circuit coupled to the control unit and the memory unit and structured to output data of the memory unit according to the control of the control unit, wherein the ramp signal generation device further comprises:

an AC coupler coupled to the ramp signal generator to receive the local ramp signals from the ramp signal generator, the AC coupler structured to perform AC coupling on the received local ramp signals and generate AC-coupled ramp signals; and an integrator coupled to the AC coupler to receive the AC-coupled ramp signals and structured to integrate the AC-coupled ramp signals to generate the ramp signal, wherein the ramp signal has a full ramp range and each local ramp signal has a local ramp range determined by dividing the full ramp range by the number of the plurality of local ramp signal generators.

9. The CIS of claim 8, further comprising a buffer coupled to the integrator to buffer the ramp signal.

10. The CIS of claim 9, wherein power having a voltage level is supplied to the ramp signal generator, the integrator, and the buffer.

11. The CIS of claim 9, wherein power having a first voltage level is supplied to the integrator and the buffer,
power having a second voltage level is supplied to the ramp signal generator, the second voltage level lower than the first voltage level.

12. The CIS of claim 8, wherein the local ramp signal generators are sequentially operated to generate the local ramp signals based on the control of the control unit.

13. The CIS of claim 8, wherein the AC coupler includes coupling capacitors, each coupling capacitor coupled to each local ramp signal.

14. The CIS of claim 8, wherein the ramp signal is designed for a pixel resolution of at least 10 bits, and
power supplied to the plurality of local ramp signal generators have a voltage level lower than 2.0 V.

* * * * *